United States Patent [19]

Krueger, Jr.

[11] Patent Number: 5,400,051

[45] Date of Patent: Mar. 21, 1995

[54] METHOD AND SYSTEM FOR GENERATING VARIABLY SCALED DIGITAL IMAGES

[75] Inventor: Leroy A. Krueger, Jr., Marietta, Ga.

[73] Assignee: International Business Machines Corporation, Armonk, N.Y.

[21] Appl. No.: 975,293

[22] Filed: Nov. 12, 1992

[51] Int. Cl.[6] ............................................. G09G 1/06
[52] U.S. Cl. ..................................... 345/127; 345/149
[58] Field of Search ............... 340/731, 728, 721, 723, 340/799; 382/47, 41; 358/451; 345/127, 128, 129, 130, 131, 147, 149

[56] References Cited

U.S. PATENT DOCUMENTS

| | | | |
|---|---|---|---|
| 4,153,896 | 5/1979 | White | 340/731 |
| 4,412,252 | 10/1983 | Moore et al. | 340/731 |
| 4,630,039 | 12/1986 | Shimada | 340/731 |
| 4,712,140 | 12/1987 | Mintzer et al. | 340/731 |
| 4,751,507 | 6/1988 | Hama et al. | 340/731 |
| 4,764,975 | 8/1988 | Inoue | 340/731 |
| 4,790,028 | 12/1988 | Ramage | 340/731 |
| 4,809,345 | 2/1989 | Tabata et al. | 382/47 |
| 4,907,171 | 3/1990 | Nagashima | 340/731 |
| 4,907,284 | 3/1990 | Ohuchi | 340/731 |
| 4,933,775 | 6/1990 | Shimura | 358/451 |
| 4,952,923 | 8/1990 | Tamura | 340/731 |
| 5,089,893 | 2/1992 | Iwase | 382/47 |
| 5,107,254 | 4/1992 | Choi | 340/731 |
| 5,121,222 | 6/1992 | Endoh et al. | 358/451 |
| 5,172,103 | 12/1992 | Kita | 340/731 |

Primary Examiner—Alvin E. Oberley
Assistant Examiner—Xiao M. Wu
Attorney, Agent, or Firm—John J. Timar; Kenneth C. Hill; Andrew J. Dillon

[57] ABSTRACT

A system and method for generating a variably scaled digital image. A second digital image containing a second plurality of pels is generated from first digital image containing a first plurality of pels. The first digital image may be stored in an image buffer. Each of the first plurality of pels is input serially into a process whereby a first and a second scaling factor are applied to the luminance values associated with a pel. A determination is made as to whether or not the scaled luminance values overflow vertically and horizontally into surrounding pels in the second plurality of pels. If the scaled luminance values overflow vertically, the overflow is stored in a line buffer to be added to future scaled luminance values. If the scaled luminance values overflow horizontally, the overflow is accumulated in an accumulator to be added to future scaled luminance values. Once a pel in the second plurality of pels is completely filled with luminance values, the pel is output to a buffer and is ready to be displayed.

20 Claims, 8 Drawing Sheets

Proportions of 3 x 3 scaled to 2 x 2

Fig. 2a

|  40 | | | 42 |
|---|---|---|---|
| 2/3 × 2/3 | 1/3 × 2/3 | 1/3 × 2/3 | 2/3 × 2/3 |
| 2/3 × 1/3 | 1/3 × 1/3 | 1/3 × 1/3 | 2/3 × 1/3 |
| 2/3 × 1/3 | 1/3 × 1/3 | 1/3 × 1/3 | 2/3 × 1/3 |
| 2/3 × 2/3 | 1/3 × 2/3 | 1/3 × 2/3 | 2/3 × 2/3 |
| 44 | | | 46 |

Proportions of 3 × 3 scaled to 2 × 2

Fig. 2b

| 22 | 24 | 26 |
|----|----|----|
| 28 | 30 | 32 |
| 34 | 36 | 38 |

3 × 3

→

| 40 | 42 |
|----|----|
| 44 | 46 |

2 × 2

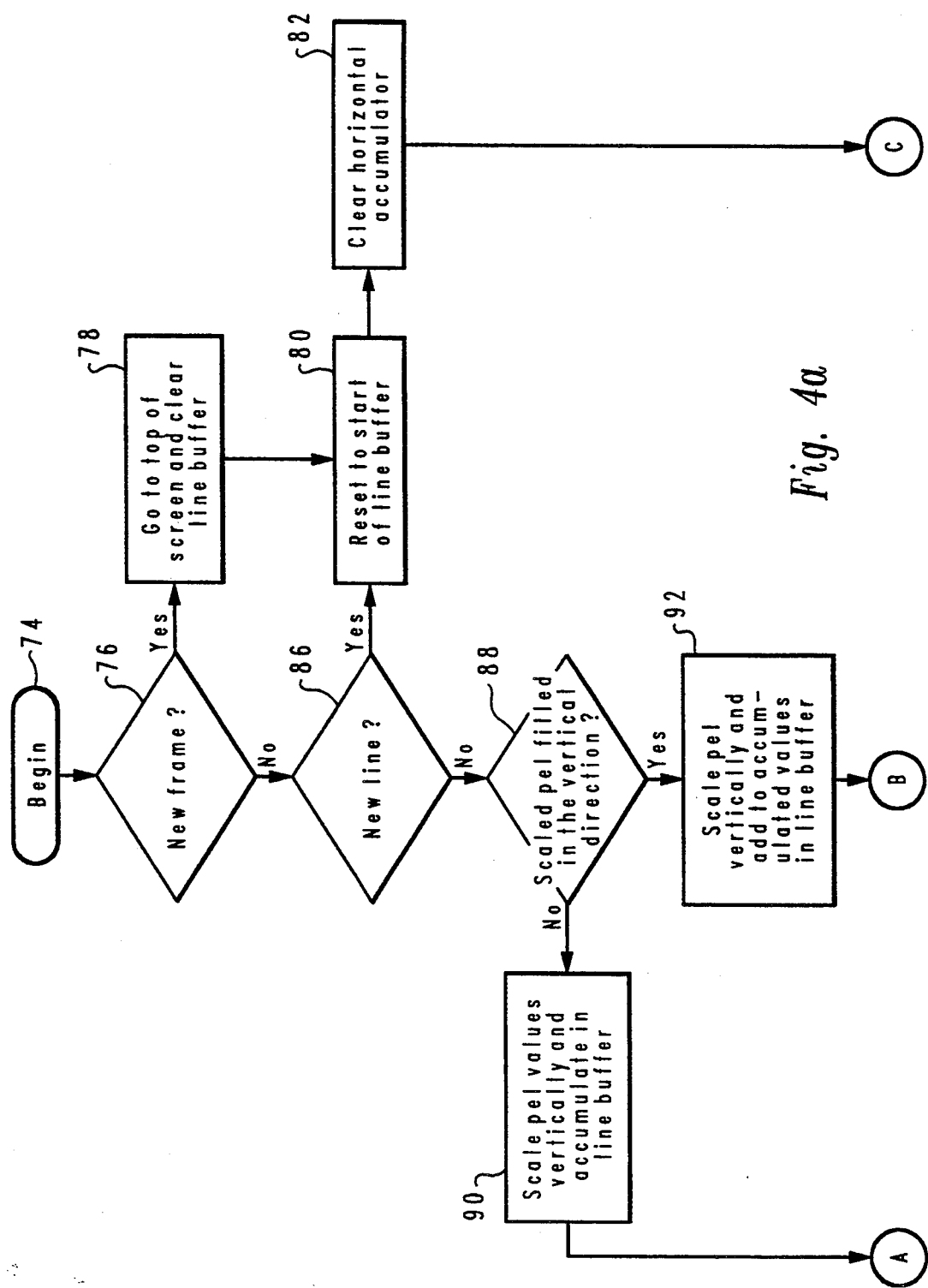

METHOD AND SYSTEM FOR GENERATING VARIABLY SCALED DIGITAL IMAGES

NOTICE OF COPYRIGHT PROTECTION

A portion of the disclosure of this patent document contains material which is subject to copyright protection. The copyright owner has no objection to facsimile reproduction by anyone of the patent document or the patent disclosure, as it appears in the Patent and Trademark Office patent file or records, but otherwise reserves all copyright rights whatsoever.

BACKGROUND OF THE INVENTION

1. Technical Field

The present invention relates in general to image processing, and in particular to digital image processing. Still more particularly, the present invention relates to a system and method for generating a variably scaled digital image.

2. Description of the Related Art

In a number of business and personal applications, it has become desirable to generate a variably scaled digital image in order to produce a display which may be smaller or larger than the original digital image. A number of applications exist where a digital image needs to be reduced or enlarged, due to the size of a display or as a result of the need or desire to place more than one image on a display at one time.

A simple technique utilized to reduce an image is the deletion of picture elements, known in the art as pixels or pels. The deletion of pels is accomplished by typically selecting every Nth pel in the X direction of the original image, and every Mth pel in the Y direction of the original image, and placing the pels in the reduced image while discarding all other pels to obtain a reduction in the size of the original image. An example of this technique is disclosed in U.S. Pat. No. 4,412,252, Moore et al., entitled *Image Reduction System*, issued Oct. 25, 1983.

A disadvantage of this technique, however, is that the information contained in the discarded pels is lost completely. Images containing linear features, like maps or text, experience an annoying visual effect when processed with this technique.

One way to mitigate this effect is to apply some filtering function that computes a local weighted average on the input pels within a specified neighborhood around the position of the output pel. The value of the output pel is then obtained as a contribution of the corresponding input neighbor pels. This technique has been applied by Tabata et al., *High Speed Image Scaling for Integrated Document Management*, ACM 2nd Conference on Office Information Systems, Toronto (June 1984), using a 2 by 2 neighborhood weighting window on the input image.

This approach, however, encounters the same disadvantage discussed above when the reduction factor is over 2. Some of the input pels are not included in the computation of any output pel, and the information contained in the discarded pels is lost completely.

Another technique utilized to generate a variably scaled digital image is to employ multiplication and/or division operations in the method of scaling an image. Although implementing multiplication and division operations in hardware improves the speed of the operations, those skilled in the art will recognize that multiplication and division operations require complex circuitry. The disadvantage to this technique is that the complex circuitry is very expensive.

U.S. Pat. No. 4,725,892, Suzuki et al., entitled *Method and Apparatus for Enlarging or Reducing an Image on the Basis of Precalculated Reference Pel Contribution Rate Data and Two-Dimensional Reference Window Shifting Amount Data Stored in a Table Memory*, issued Feb. 16, 1988, teaches a method for reducing or enlarging an image which utilizes a reference window. The reference window determines the pels which are included in a particular scaling step. During the reduction of an image, the reference window shifts its location for each output of a pel. When an image is enlarged, however, the reference window does not always shift a position for each pel output. This is due to the fact that the spacing between estimated pels becomes smaller as the enlargement ratio becomes higher. The failure to shift position causes one or more pels to be included in a scaling step more than once. Including one or more pels in a scaling step more than once means more power is spent on reducing an image. More operations are required to reduce the image, which eventually translates into increased costs.

Therefore, it would be desirable to provide a method and system for efficiently generating a variably scaled digital image which is less expensive and which generates a high quality digital image.

SUMMARY OF THE INVENTION

It is therefore one object of the present invention to provide a system and method for generating a second digital image from a first digital image.

It is another object of the present invention to provide a system and method for generating a variably scaled digital image which includes the luminance values from each and every pel from the first digital image in the second digital image.

It is yet another object of the present invention to provide a method and system for generating a variably scaled digital image which efficiently generates the second digital image.

The foregoing objects are achieved as is now described. A system and method for generating a second digital image containing a second plurality of pels from first digital image containing a first plurality of pels may initially include the storing of the first digital image in an image buffer. Each of the first plurality of pels is then input serially into a process whereby a first and a second scaling factor are applied to the luminance values associated with a pel. A determination is made as to whether or not the scaled luminance values overflow vertically and horizontally into surrounding pels in the second plurality of pels. If the scaled luminance values overflow vertically, the overflow is stored in a line buffer to be added to future scaled luminance values. If the scaled luminance values overflow horizontally, the overflow is accumulated in an accumulator to be added to future scaled luminance values. Once a pel in the second plurality of pels is completely filled with luminance values, the pel is output to a buffer and is ready to be displayed.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 2(a) is a pictorial illustration of luminance values for a 2 by 2 digital image generated from a 3 by 3 digital image according to the present invention.

FIG. 2(b) is a pictorial representation of the pels which define the 3 by 3 image and the 2 by 2 image.

FIG. 4(a)–4(b) are high level flow charts illustrating a method of generating a variably scaled digital image according to the present invention.

DETAILED DESCRIPTION OF PREFERRED EMBODIMENT

Figure 1:
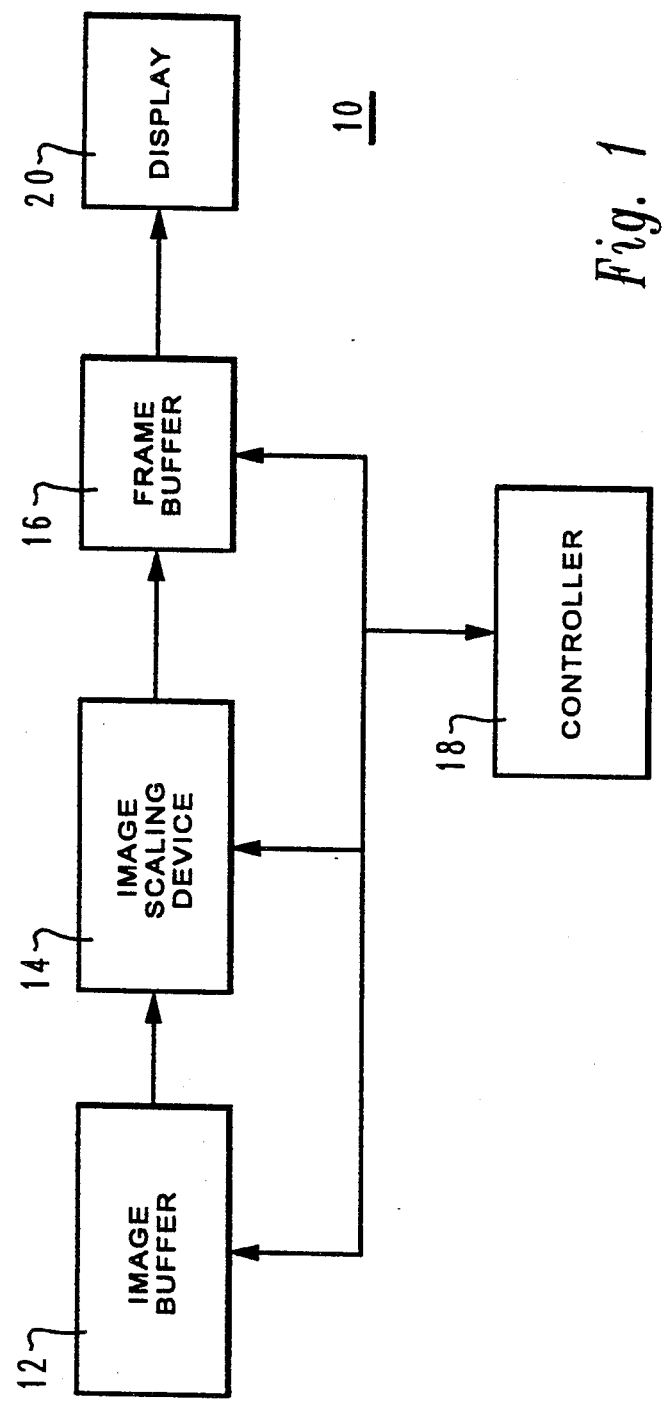
FIG. 1 is a high level block diagram illustrating a portion of a graphics display system which may be utilized to implement the present invention.

With reference now to the figures and in particular with reference to FIG. 1, a high level block diagram illustrating a portion of a graphics display system which may be utilized to implement the present invention is shown. The system 10 may be configured to reduce or enlarge a digital image. In the preferred embodiment, the system first comprises an image buffer 12. Image buffer 12 is a conventional memory device containing the digital image to be processed. Image buffer 12 may be loaded by any of a number of mechanical and/or electrical processes. By way of example only, the image buffer 12 may be loaded as a result of digitizing the output of a television camera.

Image buffer 12, however, is not necessary in all systems because the image may not need to be buffered before it is processed. For those systems which have to digitize a signal first, an analog to digital converter may be utilized instead of image buffer 12.

The system 10 further comprises an image scaling device 14. Image scaling device 14 may be either a circuit or an integrated circuit which preferably generates variably scaled digital images at a rate of 60 images per second. Image scaling device 14 determines a first and a second scaling factor, extracts data from image buffer 12, applies the first and second scaling factors to the data, accumulates and stores the scaled data, and generates a second digital image from the scaled data.

The scaled data which defines the second digital image is stored in a frame buffer 16. Frame buffer 16 may be any conventional memory device, or it may be a buffer located in image scaling device 14. Alternatively, the pels output from image scaling device 14 may directly drive a display device, since the pels when output from image scaling device 14 are in raster order.

A controller 18 controls the overall operation. Controller 18 may be a separate conventional control device, or it may be part of an integrated circuit which includes image scaling device 14. Finally, a conventional display device 20 is utilized to display the second digital image.

FIG. 2(a) is a pictorial illustration of luminance values for a 2 by 2 digital image generated from a 3 by 3 digital image according to the present invention. The original pels in the 3 by 3 digital image are indicated by the lighter lines, while the pels in the 2 by 2 digital image are indicated by the heavier lines. FIG. 2(b) is a pictorial representation of the pels which define the 3 by 3 image and the 2 by 2 image. The pels are numbered with reference numbers in order to aid in the description of FIG. 2(a).

FIG. 2(a) illustrates the ratios of the luminance values from the 3 by 3 image now contained in the 2 by 2 image. The luminance value for pel 40 (upper left pel of the 2 by 2 digital image), is composed of 4/9 of the luminance values from pel 22, 2/9 of the luminance values from pel 24 and pel 28, and 1/9 of the luminance values from pel 30.

As can be seen, the luminance value for pel 42 contains 2/9 the luminance values of pels 24 and 32, 4/9 the luminance values of pel 26, and 1/9 the luminance values from pel 30. Pel 44 is composed of 4/9 the luminance values from pel 34, 2/9 the luminance values from pels 28 and 36, and 1/9 the luminance values from pel 30. Finally, pel 46 contains 4/9 the luminance values from pel 38, 2/9 the luminance values from pels 32 and 36, and 1/9 the luminance values from pel 30.

Figures 3A, 3B:
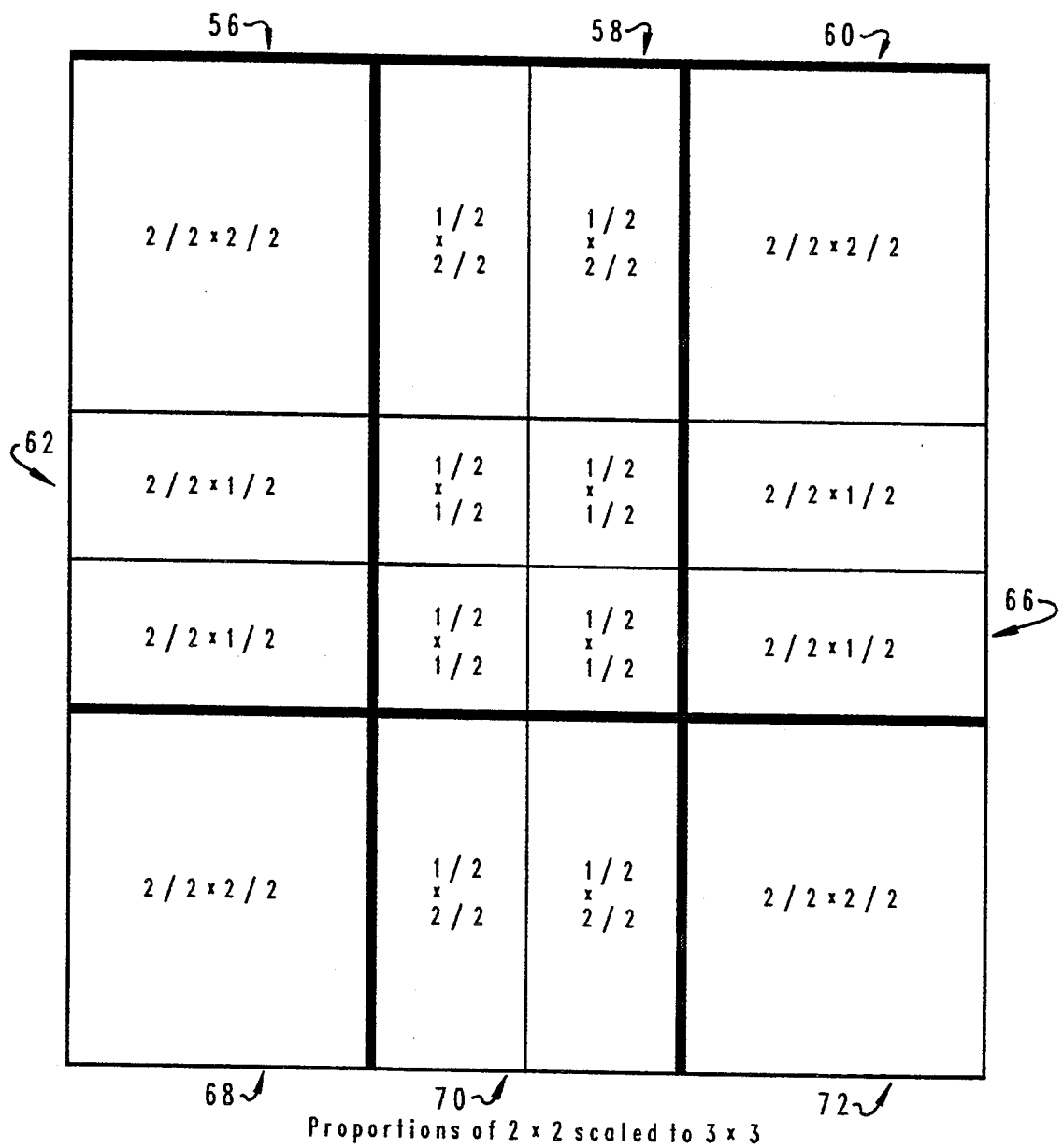
FIG. 3(a) is a pictorial illustration of luminance values for a 3 by 3 digital image generated from a 2 by 2 digital image according to the present invention.
FIG. 3(b) is a pictorial representation of the pels which define the 3 by 3 image and the 2 by 2 image.

FIG. 3(a) is a pictorial illustration of luminance values for a 3 by 3 digital image generated from a 2 by 2 digital image according to the present invention. The original pels in the 2 by 2 digital image are indicated by the lighter lines, while the pels in the 3 by 3 digital image are indicated by the heavier lines. FIG. 3(b) is a pictorial representation of the pels which define the 3 by 3 image and the 2 by 2 image. The pels are numbered with reference numbers in order to aid in the description of FIG. 3(a).

FIG. 3(a) illustrates the ratios of the luminance values from the 3 by 3 image now contained in the 2 by 2 image. The luminance values for pel 56 (upper left pel of the 3 by 3 digital image), is composed entirely of the luminance values from pel 48. The luminance values for pel 58 contains ½ of the luminance values from pels 48 and 50, while the luminance values for pel 60 is composed entirely of the luminance values from pel 50.

As can be seen, the luminance value for pel 62 contains ½ the luminance values of pels 48 and 52. Pel 64 is composed of ¼ the luminance values from pels 48, 50, 52, and 54. To finish out the last pel position in the second row, pel 66 contains ½ the luminance values from pels 50 and 54.

Continuing with the first pel in the third row, pel 68 is composed entirely of the luminance values from pel 52. The luminance values for pel 70 are derived from ½ the luminance values from pels 52 and 54. Finally, pel 72 is composed entirely of the luminance values from pel 54.

Figure 4B:
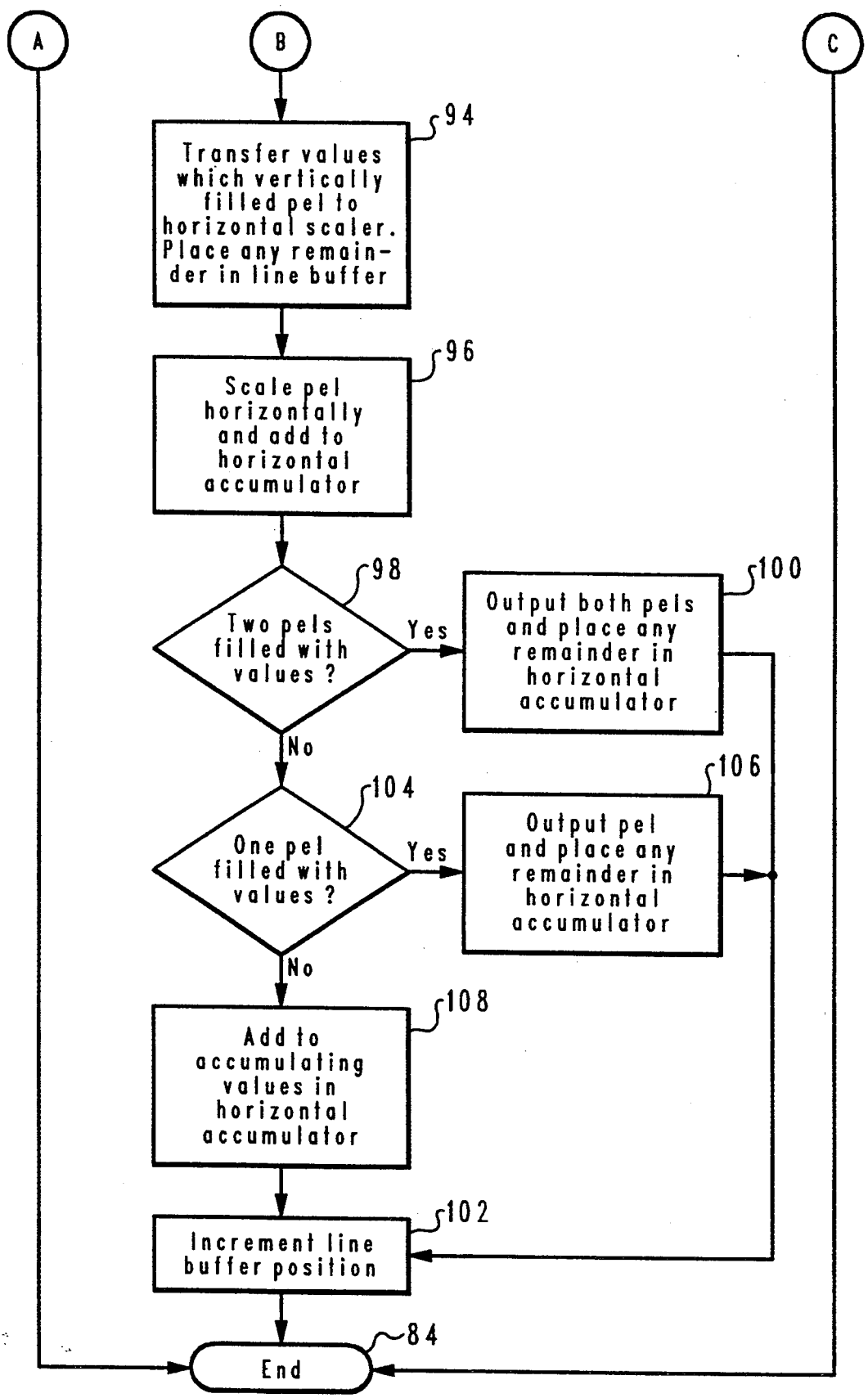

Referring to FIG. 4, a high level flow chart illustrating a method of generating a variably scaled digital image according to the present invention is shown. The method depicted in FIG. 4 is described with reference to a situation where the user would have the option to reduce a digital image from 1–100% in the y direction, and reduce or enlarge the image from 1–200% in the x direction. These limitations are included by way of example only. A person skilled in the art could modify the process to include different limitations.

The process is called for each and every pel in the original digital image. Each pel is read from the image buffer 12 in FIG. 1, and the procedure illustrated in FIG. 4 is then called. The method begins at block 74, and thereafter passes to block 76. Block 76 illustrates a determination of whether or not there has been a vertical synchronization, which indicates a new frame. In the preferred embodiment, a vertical synchronization is determined by the reading of the first line in the image from the image buffer. In an alternative embodiment which utilizes an analog to digital converter, a vertical synchronization is determined by a separate signal sent from the analog to digital converter.

If there has been a vertical synchronization, control passes to block 78, which depicts the need to clear the line buffer and begin at the top of the screen. After the line buffer is cleared, a reset to the start of the line buffer occurs, as shown in block 80. Thereafter, control moves to block 82, which illustrates clearing the horizontal accumulator. In the preferred embodiment, the horizontal accumulator is a one pel wide storage location which is utilized to accumulate scaled pel information. Since this completes the process for this call, the process jumps to block 84.

If there has not been a vertical synchronization, control passes to block 86. Block 86 illustrates the determination of whether or not there has been a horizontal synchronization, which indicates a new line in the original digital image. In the preferred embodiment, a horizontal synchronization is determined by the resetting of the line number to zero. If there has been a horizontal synchronization, the method passes to block 80, which depicts a reset to the start of the line buffer. Thereafter, control moves to block 84, which illustrates clearing the horizontal accumulator. Since this completes the process for this call, the process jumps to block 84.

If there has not been a horizontal synchronization, the method continues at block 88. Block 88 depicts a determination of whether or not a pel in the second digital image, in other words a scaled pel, has been filled with luminance values in the vertical direction. If the scaled pel has not been filled vertically, the luminance values are then scaled vertically and added to the line buffer. This step is illustrated in block 90. Since this completes the process for this pel, the process jumps to block 84.

Referring again to block 88, if the scaled pel has been filled vertically, the luminance values are then scaled and stored in the line buffer. This step is illustrated in block 92. After accumulating the vertically scaled luminance values in the line buffer, the method continues at block 94, where the vertically scaled luminance values are transferred to a horizontal scaler, and any remaining vertically scaled luminance values are stored in the line buffer. Block 96 depicts the generation of horizontally scaled luminance values and storing of such into the horizontal accumulator. At this point, the luminance values have been scaled both vertically and horizontally.

Referring to block 98, a determination is made as to whether or not a sufficient amount of scaled luminance values exists to fill two pels in the new digital image. A test for two pels is necessary in this example because the image can be expanded up to 200% in the x direction. If two pels are filled, the two pels are stored in a frame buffer or some similar memory device and any remaining scaled luminance values are stored in the horizontal accumulator. This is shown in block 100. The method then continues at block 102, where the position in the line buffer is incremented. This completes the process for the pel, so the process ends, as shown in block 84.

Referring again to block 98, if two pels are not filled, a determination is made as to whether or not one pel is filled. This step is depicted in block 104. If one pel is filled, the method continues at block 106, with outputting the filled pel and accumulating any remainder in the horizontal accumulator. The method then continues at block 102, where the position in the line buffer is incremented. This completes the processing of the pel, so the process ends, as shown in block 84.

If one pel is not filled completely, the scaled luminance values are added to the accumulating values in the horizontal accumulator, as shown in block 108. After storing the scaled luminance values in the horizontal accumulator, control passes to block 102. Thereafter, the method ends at block 84.

FIGS. 5(a)-5(h) are more detailed pictorial illustrations of a method of generating a 2 by 2 digital image from a 3 by 3 digital image according to the present invention. The pels in the 3 by 3 image are numbered in the order in which they are processed, and the pels in the 2 by 2 image are numbered in the order in which they are generated in the preferred embodiment.

Figure 5:
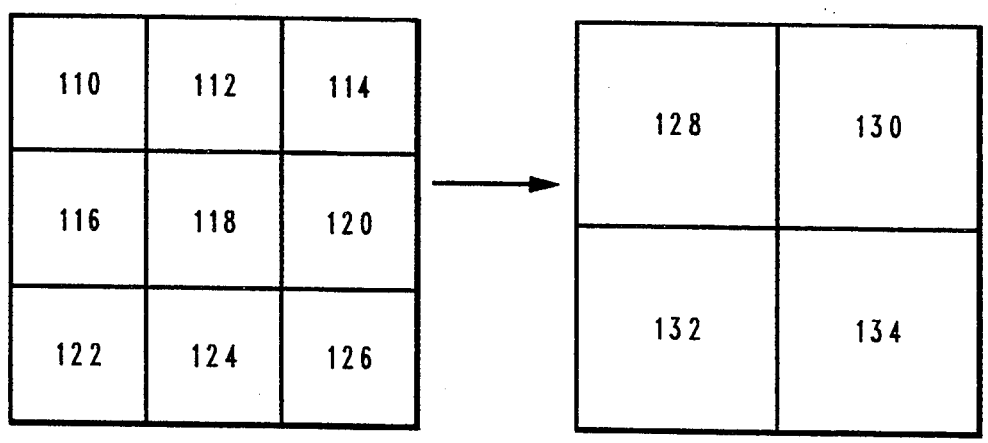
FIGS. 5 and 5(a)–5(h) are more detailed pictorial illustrations of a method of generating a 2 by 2 digital image from a 3 by 3 digital image according to the present invention.
Figure 5A:
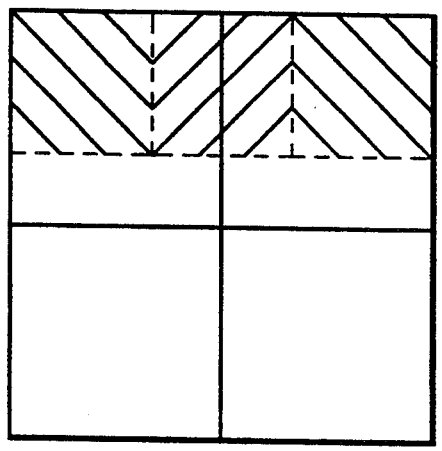

Referring to FIG. 5(a), the luminance values in pels 110-114 are read serially from memory and are scaled vertically. Because pel 110 does not fill pel 128 vertically, the processed luminance values from pel 110 are stored in a line buffer. This is also true for pels 112 and 114. Pels 110-114 are shown in the 2 by 2 image in order to aid in the explanation of the method. Placing the pels in the 2 by 2 image makes it easier to keep track of the pels. Remember, at this point in the method, pels 110-114 have been read serially and have been only partially processed.

Figure 5B:
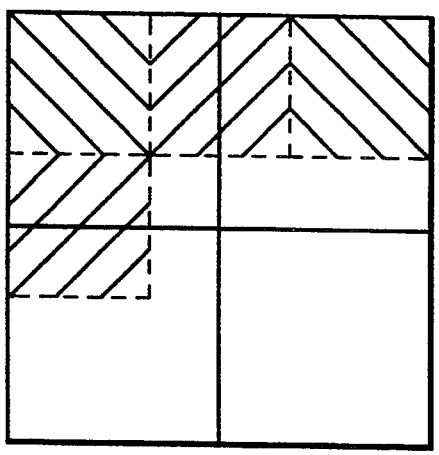

Referring to FIG. 5(b), the next pel, pel 116, is scaled vertically. Because pel 116 fills pel 128 in the vertical direction, the accumulated vertically scaled luminance values from pels 110 and 116 are then transferred to the horizontal scaler and processed. The portion of the scaled luminance values from pel 116 which overflow into pel 132 are stored in the line buffer to be added to future incoming pel information for pel 132.

Figure 5C:
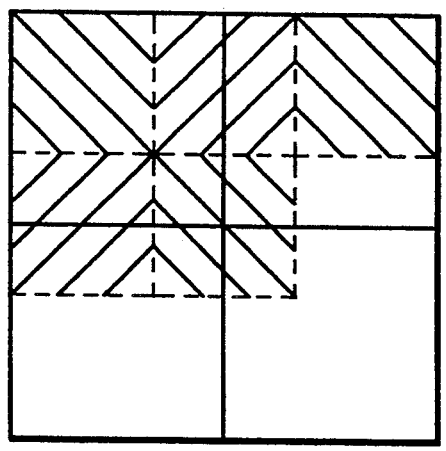

The method continues with the receipt of luminance values for pel 118, as shown in FIG. 5(c). The luminance values are scaled vertically first. Because pel 118 also fills pel 128 in the vertical direction, the vertically scaled luminance values from pels 112 and 118 are then transferred to the horizontal scaler and processed.

With the processing of pel 118, pel 128 is filled completely. Therefore, pel 128 is output to a frame buffer or similar memory device. The portions of the scaled luminance values from pel 118 which overflow into pels 132 and 134 are stored in the line buffer to be added to future incoming pel information for pels 132 and 134. The remaining scaled luminance values which overflow into pel 130 are stored in the horizontal accumulator to be added to future incoming pel information for pel 130.

Figure 5D:
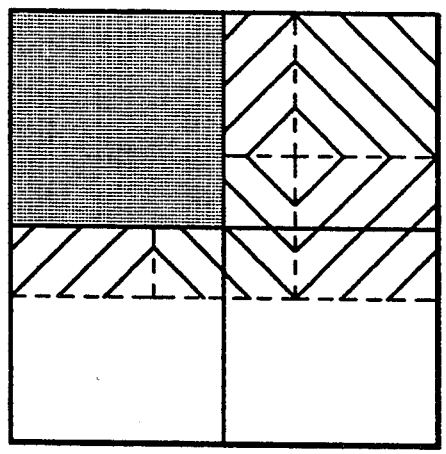

Referring to FIG. 5(d), pel 128 is darkened to indicate it has been output to a frame buffer. The luminance values from the final pel in the second row of the 3 by 3 image, pel 120, are read and scaled vertically. Pel 120 fills pel 130 in the vertical direction, so the accumulated vertically scaled luminance values from pels 114 and 120 are transferred to the horizontal scaler, processed, and added to the scaled luminance values in the horizontal accumulator.

With the processing of pel 120, pel 130 is filled completely. Pel 130 is then output to a frame buffer or similar memory device. The remaining scaled luminance values which overflow into pel 134 are stored in the line buffer to be added to future incoming pel information for pel 134.

Figure 5E:
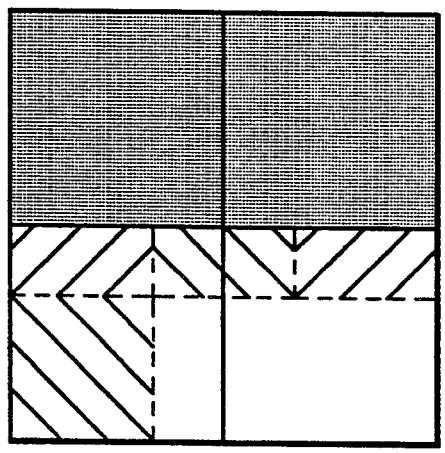

Because the process has reached the end of the line, the horizontal accumulator is cleared. Referring to FIG. 5(e), pels 128, 130 are darkened to indicate they have been output to a frame buffer. The luminance values from the first pel in the third row of the 3 by 3 image, pel 122, is read and scaled vertically. Because pel 122 fills pel 132 in the vertical direction, the vertically scaled luminance values from pel 122 are transferred to the horizontal scaler and processed.

Figure 5F:
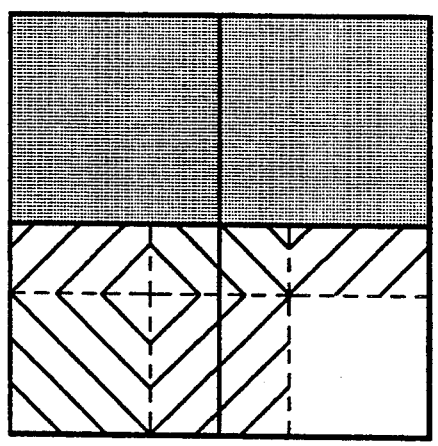

As shown in FIG. 5(f), the luminance values for pel 124 are read and vertically scaled. Because pel 124 fills pel 132 in the vertical direction, the vertically scaled luminance values from pel 124 are then transferred to the horizontal scaler and processed. Pel 132 is now completely filled with luminance values. Therefore, pel 132 is output to a frame buffer or similar memory device. The portion of the scaled luminance values from pel 124 which overflow into pel 134 are stored in the line buffer to be added to future incoming pel information for pel 134.

Figure 5G:
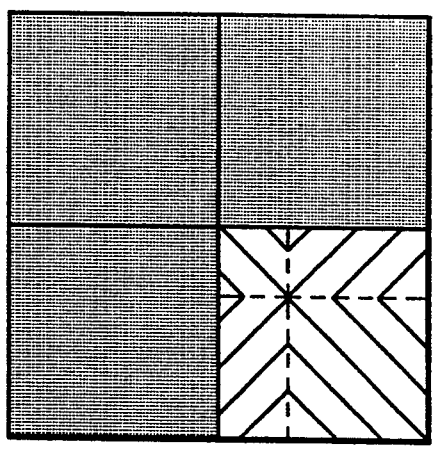

Referring to FIG. 5(g), pels 128, 130 and 132 are darkened to indicate they have been output to a frame buffer. The luminance values from the final pel in the third row of the 3 by 3 image, pel 126, is read and scaled vertically. Because pel 126 fills pel 134 in the vertical direction, the vertically scaled luminance values from pel 126 are transferred to the horizontal scaler and added to the accumulated scaled luminance values in the line buffer.

Figure 5H:
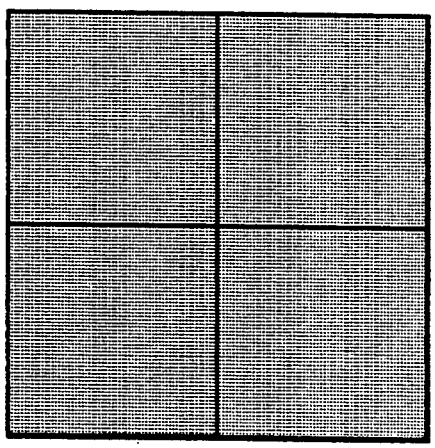

With the processing of pel 126, pel 134 is filled completely, so pel 134 is then output to a frame buffer or similar memory device. FIG. 5(h) depicts pels 128, 130, 132 and 134 as darkened to indicate they have been output to a frame buffer. Generation of the 2 by 2 image from the 3 by 3 image is now complete.

One implementation of the method described with reference to FIGS. 4 and 5 is included in Appendix A. Appendix A is a procedure written in C programming language which efficiently implements the method of the present invention on a RGB 24 bit color bitmap. A multiply and divide by a power of two operation is utilized in the procedure. For efficiency, dividing by a power of two is implemented by right shifting a value a number of bits which corresponds to the power of two. The variables which are used to multiply the luminance values are determined in a two step process. First, and horizontal and vertical adder variables are determined by multiplying the number of pels in the new image by $2^{18}$, then dividing by the number of pels in the original image. The integer 1 is then added to this number. Multiplying by $2^{18}$ creates a large number which helps in preserving the precision of the values. This step is performed by the procedure init-chip in Appendix A.

Next, horizontal and vertical multiplicands are determined from the adder variables and a running total. The running total is first ANDed with $2^{19}-1$, and then divided by $2^1$. This has the effect of right shifting the values 10 bits to leave 8 bits. A test is then performed to see if the scaled luminance values fill up 2 pels at one time, fill up one pel with some overflow, or do not fill up one pel. These steps are performed by the procedure get-hmuls and get-vmuls in Appendix A.

The horizontal and vertical multiplicands and adder variables are determined for the first pel before the first luminance value is accepted. In order to do vertical scaling, a line buffer is required to buffer the partial results until they are completed. Thus, the variable LINE in Appendix A is an array of unsigned integer variables of 8 bits which have a global domain. The number of elements in the line array is the same as the maximum number of horizontal positions in an original bitmap. The variable LINEPOS is an unsigned integer variable of 10 bits which keeps track of the horizontal position within the LINE array.

The method described above may be implemented in hardware or software. The method can be used to generate a variably scaled image with either an interlaced or non-interlaced digital image. It also may be utilized with any linear value image space, examples being RGB, YUV, or monochrome, because every separate channel is handled as a separate parallel path. Although the method is described with vertical scaling occurring first and horizontal scaling occurring second, the order of scaling may be switched, so that horizontal scaling occurs first and horizontal vertical scaling second.

Furthermore, those skilled in the art will recognize that the method described with reference to FIG. 4 may be modified according to different requirements. For example, if a user wished to have the option of expanding an image in the y direction, a test similar to the one depicted in block 98 would need to be included to test for whether or not two pels have been filled vertically. It is also possible to modify the method to test for more than two pels filled at one time. For example, if a small image is enlarged to a very large image, it may be necessary to test whether or not 3, 4 or more, pels are filled at one time.

Upon reference to the foregoing, those skilled in the art will appreciate that Applicant has invented a method for generating a variably scaled digital image which results in a higher quality digital image because none of the luminance information is discarded. The luminance values from each and every pel in the original digital image is included in the generation of the scaled digital image. The method generates a variably scaled digital image by utilizing only addition and truncation operations. This feature, along with the processing of each pel in the original image serially, significantly reduces the cost to implementation the method.

While the invention has been particularly shown and described with reference to a preferred embodiment, it will be understood by those skilled in the art that various changes in form and detail may be made therein without departing from the spirit and scope of the invention.

APPENDIX A

// RGBScale.c        1/23/91            LeRoy A. Krueger

// 8 bit multiply version
// 10 bit adder

// can shrink y incrementally by pel from 1% to 100%
// can shirnk or expand x incrementally by pel from 1% to 200%

// a BYTE is 8 bits, a USHORT is 16 bits and a ULONG is 32 bit include <memory.h>  // memset( );

typedef unsigned char       BYTE;
typedef unsigned int        USHORT;
typedef unsigned long       ULONG;
typedef int                 BOOL;

define TRUE        1
define FALSE       0
define NULL        0L define  XSRCMAX  720
define  XDESTMAX    (XSRCMAX * 2 + 1)
define  YSRCMAX  512 define QSCALE(color,mul)  ( (BYTE) ( (mul * color) >> 8))

extern void _far _cdecl emit_pel  (BYTE *rgb24, BOOL hsync,
                                    BOOL vsyne, BOOL doubleline);

USHORT hmul[3];

USHORT vmul[2];

BYTE redline[XSRCMAX]
BYTE greenline[XSRCMAX];

```
BYTE blueline[XSRCMAX];

BYTE redacc;
BYTE greenacc;
BYTE blueacc;

static ULONG vaddend;   // uses 20 bits
static ULONG vsum;      // uses 20 bits
static BOOL vfull0;

static ULONG haddend;   // uses 20 bits
static ULONG hsum;      // uses 20 bits
static BOOL hfull0;
static BOOL hfull1;

void get_vmuls (USHORT *mul)

{ unsigned short new;
unsigned short old;

old = (vsum >> 10);
vsum += vaddend;
new = (vsum >> 10);
vsum &= 0x0003FFFFL;   // saves 18 bits if (new >= 256) {
  mul[1] = new & 255;
  mul[0] = 256 - old;
  vfull0 = TRUE;
}     else {
  mul[0] = vaddend >> 10;
  mul[1] = 0;
  vfull0 = FALSE;
}

}
```

```c
void get_hmuls (USHORT *mul)

{
unsigned short new;
unsigned short old;

old = (hsum >> 10);
hsum += haddend;
new = (hsum >> 10);
hsum &= 0x0003FFFFL;  // saves 18 bits if (new >= 512) {
  mul[2] = new & 255;
  mul[1] = 256;
  mul[0] = 256 - old
  hfull0 = TRUE;
  hfull1 = TRUE;
}       else if (new >= 256) {
  mul[2] = 0;
  mul[1] = new & 255;
  mul[0] = 256 - old;
  hfull0 = TRUE;
  hfull1 = FALSE;
}       else {
  mul[2] = 0;
  mul[1] = 0;
  mul[0] = haddend >> 10;
  hfull0 = FALSE;
  hfull1 = FALSE;
}

}
// primary input
// takes rgb24 pel[] in red, green, blue order void pel_in (BYTE *pel, BOOL hsync, BOOL vsync)

{
```

```c
static USHORT linepos = 0;
BYTE   redpel;
BYTE   greenpel;
BYTE   bluepel;
BYTE   opel[3];

if (vsync) { vsum = 0;

// clear the line accumulators
  memset (redline,   0, XSRCMAX);
  memset (greenline, 0, XSRCMAX);
  memset (blueline,  0, XSRCMAX);

// vertical retrace: field end/begin
  emit_pel (NULL, FALSE, TRUE, FALSE);  // do a vertical sync get_vmuls (vmul);

}       else if (hsync) {
// horizontal retrace; line end/begin
hsum = 0;
linepos = 0;

// clear the horizontal accumulators
redacc   = 0;
greenacc = 0;
blueacc  = 0;

// emit a linefeed if required
if (vfull0) {
        // do a line feed, with appropriate doubles setting
        emit_pel (NULL, TRUE, FALSE, FALSE );
} get_vmuls (vmul);
```

```
}        else {

// normal pel input if (vfull0) {
    // this is the case where this line fills the accumulator line // this pel is the sum of all of the accumulated lines
    redpel   = (redline [linepos] + QSCALE (pel[0], vmul[0]) );
    greenpel = (greenline [linepos] + QSCALE (pel[1], vmul[0]) );
    bluepel  = (blueline [linepos] + QSCALE (pel[2], vmul[0]) );

// put the overflow back into the accumulator line
    redline [linepos]   = QSCALE (pel[0], vmul[1]);
    greenline [linepos] = QSCALE (pel[1], vmul[1]);
    blueline [linepos]  = QSCALE (pel[2], vmul[1]);
    if (hfull1) {
        // two pels are full, send them both out
        // out put the first pel
        opel[0] = redacc + QSCALE (redpel,      hmul[0]);
        opel[1] = greenacc + QSCALE (greenpel,  hmul[0]);
        opel[2] = blueacc + QSCALE (bluepel,    hmul[0]);
        emit_pel (opel, FALSE, FALSE, FALSE);

// output the second pel (this will always be the unscaled pel)
        opel[0] = redpel;
        opel[1] = greenpel;
        opel[2] = bluepel;
        emit_pel (opel, FALSE, FALSE, FALSE);

// seed the accumulator with the overflow
        redacc   = QSCALE (redpel,     hmul[2]);
        greenacc = QSCALE (greenpel,   huml[2]);
        blueacc  =        QSCALE (bluepel,   huml[2]);

} else if (hfull0) {
        // one pel is full, send it out
        opel[0] = redacc + QSCALE (redpel,      hmul[0]);
```

```
        opel[1] = greenacc + QSCALE (greenpel,    hmul[0]);
        opel[2] = blueacc + QSCALE (bluepel,      hmul[0]);
        emit_pel (opel, FALSE, FALSE, FALSE);

// seed the accumulator with the overflow
    redacc    = QSCALE (redpel,     hmul[1]);
    greenacc  = QSCALE (greenpel,   huml[1]);
    blueacc   =        QSCALE (bluepel,  huml[1]);
  }       else {
    // no pels are full, accumulate this pel
    redacc    += QSCALE (redpel,    hmul[0]);
    greenacc  += QSCALE (greenpel,  huml[0]);
    blueacc   += QSCALE (bluepel, huml[0]);

}
}       else {
  // this is the case where this line does not fill the accumulator line
  if (vmul[0] {
    redline  [linepos]    += QSCALE (pel[0],  vmul[0]);
    greenline[linepos]    += QSCALE (pel[1],  vmul[0]);
    blueline [linepos]    += QSCALE (pel[2],  vmul[0]);
  }
} linepos++;

get_hmuls (hmul);
}
}
void init_chip      (USHORT hcntsrc, USHORT vcntsrc
              USHORT hcntdest, USHORT vcntdest)

{
memset (redline,   0,  XSRCMAX);
memset (greenline, 0,  XSRCMAX);
memset (blueline,  0,  XSRCMAX);

redacc   = 0;
```

```
greenacc     = 0;

blueacc  = 0;

vsum    = 0;

hsum    = 0;

// 262144 = 2**18

// range of 1 thru 525289 for haddend (20 bits used)

// remember we can go from 0 thru 200% on horizontals haddend = (hcntdest * 262144L / hcntsrc) + 1;

// range of 1 thru 262145 for vaddend (19 bits used)

vaddend = (vcntdest * 262144L / vcntsrc) + 1;

get_vmuls (vmul);

get_hmuls (hmul);

}
```

What is claimed is:

1. A method for generating a second digital image from a first digital image in a graphics display system, wherein said first digital image is comprised of a first plurality of pels, and wherein each pel of said first plurality of pels has a value associated therewith which represents the luminance of such pel, said method comprising the steps of:
determining a first and a second scaling factor;
receiving the luminance values for the first plurality of pels at a rate of one pel at a time;
applying the first scaling factor to the luminance values for all of the first plurality of pels in a first direction only at said rate of one pel at a time;
thereafter applying the second scaling factor to the luminance values for all of the first plurality of pels in a second direction only at said rate of one pel at a time;
accumulating the scaled luminance values for the first plurality of pels at said rate of one pel at a time to generate luminance values for a second plurality of pels; and
generating the second digital image from the second plurality of pels.

2. The method for generating the first digital image to the second digital image of claim 1, further comprising the step of storing the first digital image in an image buffer before determining the first and second scaling factors.

3. The method for generating the first digital image to the second digital image of claim 1, further comprising the step of displaying the second digital image on a display device.

4. The method for scaling the first digital image to the second digital image of claim 1, wherein said step of applying the first scaling factor to the luminance values for all of the first plurality of pels in the first direction only comprises applying the first scaling factor to the luminance values for all of the first plurality of pels vertically.

5. The method for scaling the first digital image to the second digital image of claim 4, wherein said step of applying the first scaling factor to the luminance values for all of the first plurality of pels vertically comprises multiplying the first plurality of pels vertically by at least one variable and dividing by a power of 2.

6. The method for scaling the first digital image to the second digital image of claim 1, wherein said step of applying the second scaling factor to the luminance values for all of the first plurality of pels in the second direction only comprises applying the second scaling factor to the luminance values for the first plurality of pels horizontally.

7. The method for scaling the first digital image to the second digital image of claim 6, wherein said step of applying the second scaling factor to the luminance values for all of the first plurality of pels horizontally comprises multiplying the first plurality of pels horizontally by at least one variable and dividing by a power of 2.

8. The method for scaling the first digital image to the second digital image of claim 1, wherein said step of accumulating the scaled values for the first plurality of pels comprises accumulating the scaled values for the first plurality of pels in a line buffer after applying the first scaling factor.

9. The method for scaling the first digital image to the second digital image of claim 8, wherein said step of accumulating the scaled values for the first plurality of pels further comprises accumulating the scaled values for the first plurality of pels in an accumulator after applying the second scaling factor.

10. The method for scaling the first digital image to the second digital image of claim 9, wherein said step of accumulating the scaled values for the first plurality of pels further comprises the steps of:
 determining whether or not a pel in the in the second plurality of pels is filled vertically with scaled luminance values from the first plurality of pels;
 determining whether or not scaled luminance values from the first plurality of pels overflow vertically into more than one pel in the second plurality of pels;
 storing the scaled luminance values from the first plurality of pels which overflow vertically into more than one pel in the second plurality of pels in the line buffer;
 determining whether or not a pel in the second plurality of pels is filled horizontally with scaled luminance values from the first plurality of pels;
 determining whether or not scaled luminance values from the first plurality of pels overflow horizontally into more than one pel in the second plurality of pels;
 storing the scaled luminance values from the first plurality of pels which overflow horizontally into more than one pel in the second plurality of pels in the accumulator; and
 outputting at least one completely filled pel in the second plurality of pels.

11. A graphics display system for generating a second digital image from a first digital image, wherein said first digital image is comprised of a first plurality of pels, and wherein each pel of said first plurality of pels has a value associated therewith which represents the luminance of such pel, said graphics display system comprises:
 means for determining a first and a second scaling factor;
 means for receiving the luminance values for the first plurality of pels at a rate of one pel at a time;
 means for applying the first scaling factor to the luminance values for all of the first plurality of pels in a first direction only at said rate of one pel at a time;
 means for thereafter applying the second scaling factor to the luminance values for all of the first plurality of pels in a second direction only at said rate of one pel at a time;
 means for accumulating the scaled luminance values for the first plurality of pels at said rate of one pel at a time to generate luminance values for a second plurality of pels; .and
 means for generating the second digital image from the second plurality of pels.

12. The graphics display system for generating the first digital image to the second digital image of claim 11, further comprising means for storing the first digital image in an image buffer before determining the first and second scaling factors.

13. The graphics display system for generating the first digital image to the second digital image of claim 11, further comprising means for displaying the second digital image.

14. The graphics display system for scaling the first digital image to the second digital image of claim 11, wherein said means for applying the first scaling factor to the luminance values for all of the first plurality of pels in the first direction only comprises means for applying the first scaling factor to the luminance values for all of the first plurality of pels vertically.

15. The graphics display system for scaling the first digital image to the second digital image of claim 14, wherein said means for applying the first scaling factor to the luminance values for all of the first plurality of pels vertically comprises means for multiplying the first plurality of pels vertically by at least one variable and dividing by a power of 2.

16. The graphics display system for scaling the first digital image to the second digital image of claim 11, wherein said means for applying the second scaling factor to the luminance values for all of the first plurality of pels in the second direction only comprises means for applying the second scaling factor to the luminance values for the first plurality of pels horizontally.

17. The graphics display system for scaling the first digital image to the second digital image of claim 16, wherein said means for applying the second scaling factor to the luminance values for all of the first plurality of pels horizontally comprises means for multiplying the first plurality of pels horizontally by at least one variable and dividing by a power of 2.

18. The graphics display system for scaling the first digital image to the second digital image of claim 11, wherein said means for accumulating the scaled values for the first plurality of pels comprises means for accumulating the scaled values for the first plurality of pels in a line buffer after applying the first scaling factor.

19. The graphics display system for scaling the first digital image to the second digital image of claim 18, wherein said means for accumulating the scaled values for the first plurality of pels further comprises means for accumulating the scaled values for the first plurality of pels in an accumulator after applying the second scaling factor.

20. The graphics display system for scaling the first digital image to the second digital image of claim 19, wherein said means for accumulating the scaled values for the first plurality of pels comprises the steps of:
 means for determining whether or not a pel in the second plurality of pels is filled vertically with scaled luminance values from the first plurality of pels;
 means for determining whether or not scaled luminance values from the first plurality of pels overflow vertically into more than one pel in the second plurality of pels;
 means for storing the scaled luminance values from the first plurality of pels which overflow vertically into more than one pel in the second plurality of pels in the line buffer;
 means for determining whether or not a pel in the second plurality of pels is filled horizontally with scaled luminance values from the first plurality of pels;
 means for determining whether or not scaled luminance values from the first plurality of pels overflow horizontally into more than one pel in the second plurality of pels;
 means for storing the scaled luminance values from the first plurality of pels which overflow horizontally into more than one pel in the second plurality of pels in the accumulator; and
 means for outputting at least one completely filled pel in the second plurality of pels.

* * * * *